INVENTORS
WALLACE W. PERKINS
WARREN E. DION
BY Edward H. Goodrich.
THEIR ATTORNEY.

July 29, 1958  W. W. PERKINS ET AL  2,845,177
INSPECTION MECHANISM
Filed June 25, 1956  7 Sheets-Sheet 3

INVENTORS
WALLACE W. PERKINS
WARREN E. DION
By Edward H. Goodrich
THEIR ATTORNEY INVENTORS
WALLACE W. PERKINS
WARREN E. DION
BY Edward H. Goodrich
THEIR ATTORNEY July 29, 1958     W. W. PERKINS ET AL     2,845,177
INSPECTION MECHANISM
Filed June 25, 1956                                               7 Sheets-Sheet 5

INVENTORS
WALLACE W. PERKINS
WARREN E. DION
BY Edward H. Goodrich
THEIR ATTORNEY

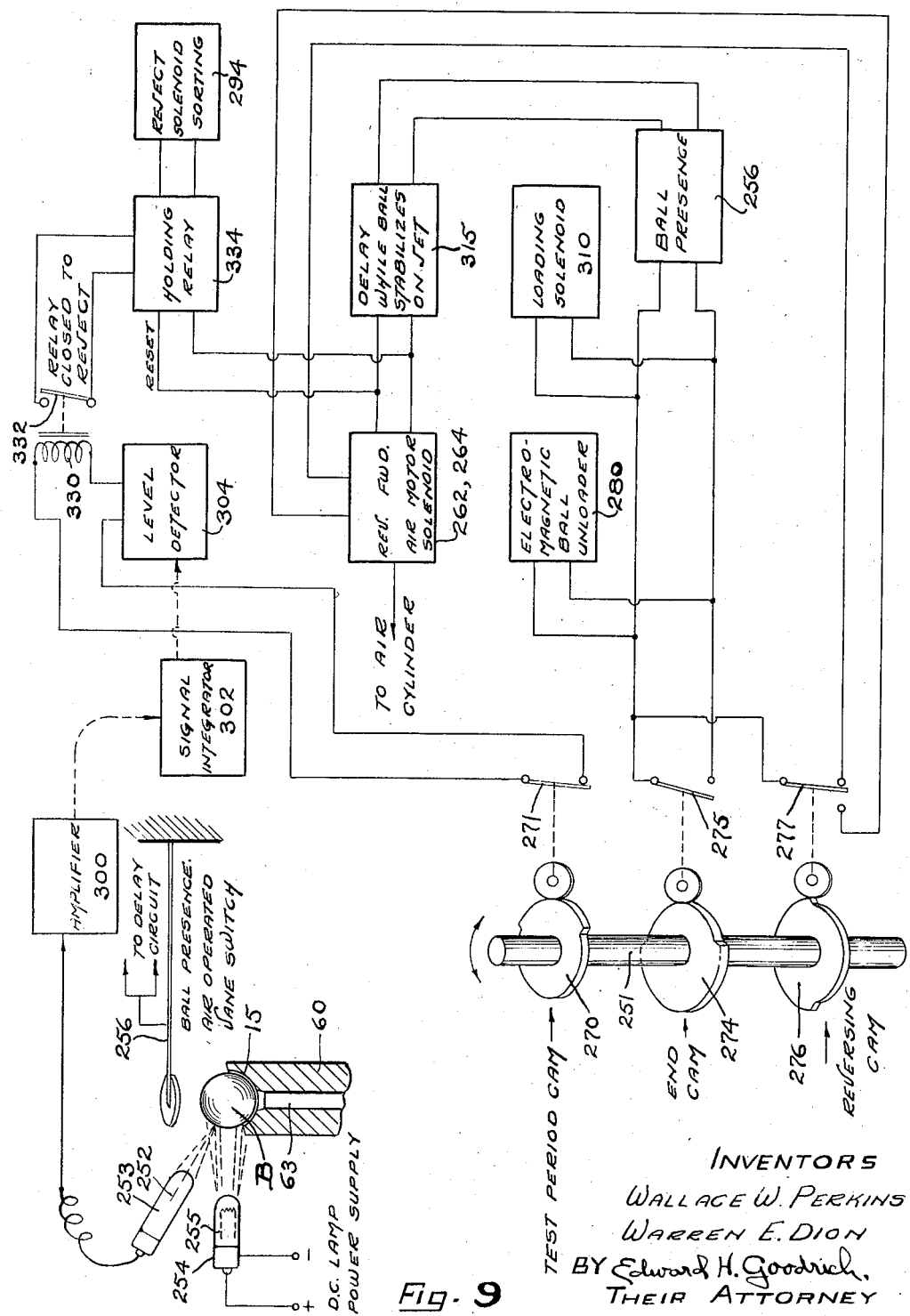

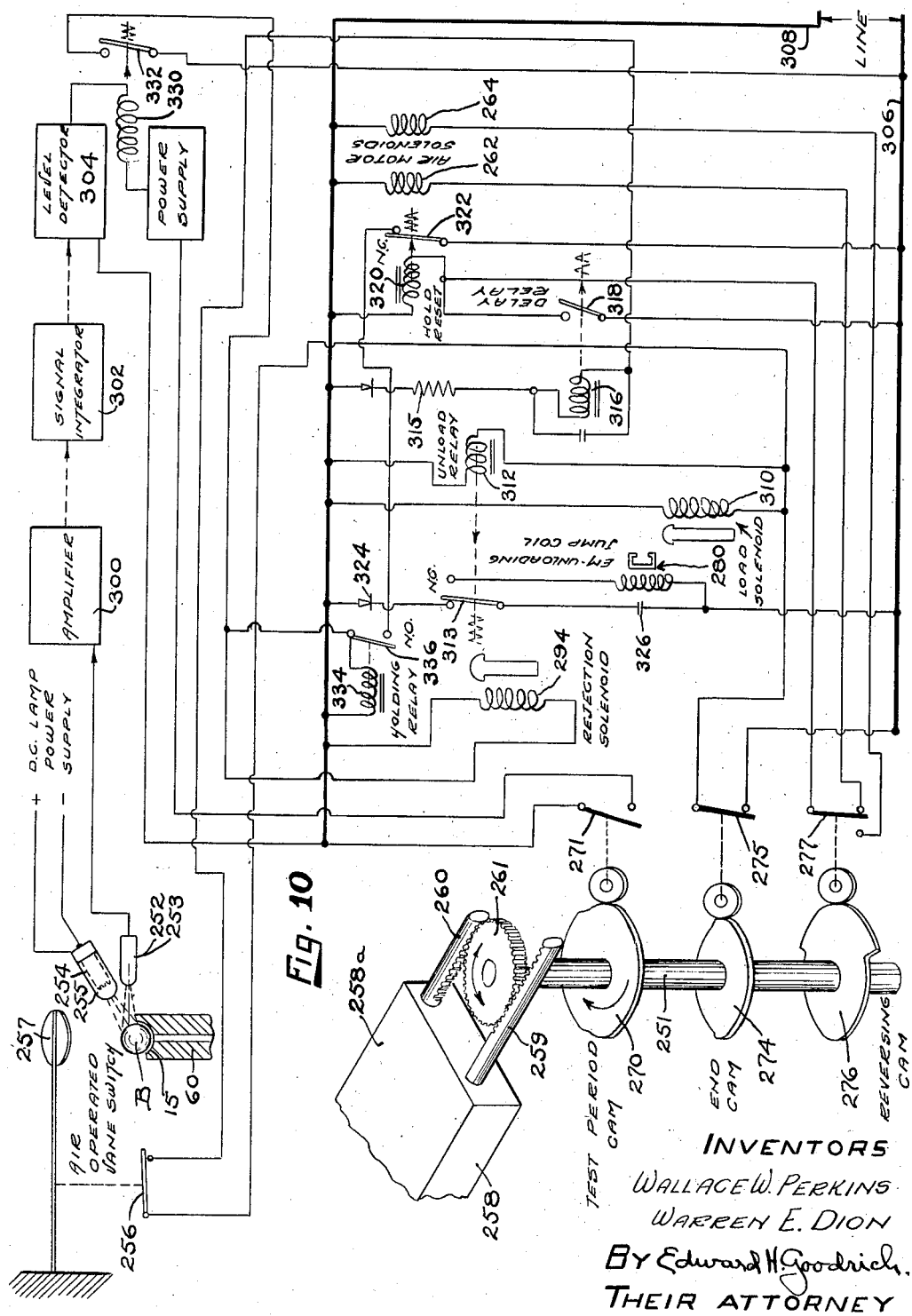

United States Patent Office 2,845,177
Patented July 29, 1958

2,845,177

INSPECTION MECHANISM

Wallace W. Perkins, West Hartford, and Warren E. Dion, Forestville, Conn., assignors to General Motors Corporation, Detroit, Mich., a corporation of Delaware Application June 25, 1956, Serial No. 593,504

18 Claims. (Cl. 209—111)

This invention relates to an inspection mechanism for surfaces of revolution and particularly to a ball scanning mechanism which sorts balls in accordance with surface defects and in accordance with accuracy of sphericity.

Balls such as those used in precision ball bearings must be extremely accurate as to size, sphericity and finish and must be free from surface defects. In the grinding of such balls, occasionally a defect in the ball material or a particle of foreign matter causes indentations in the balls which are very detrimental to the operation of a high speed precision bearing with the result that bearing life is materially shortened and bearing failure may suddenly occur. It is recognized that these surface defects, which usually apear as small black specks, often result in non-uniform pressures on bearing raceways with consequent bearing failure. It has been found that such surface defects even as small as one five thousandth of an inch can be very detrimental to precision bearing operation.

Heretofore, in checking such balls for errors, it has been common practice to slowly and manually gyrate a few of these balls at a time under a strong light while subjecting them to a visual inspection to cull out the balls with surface defects. This is very slow and tedious work and due to the frequency of human errors, many balls with surface defects are overlooked and permitted to be passed as acceptable and thereafter installed in ball bearings. Furthermore, these surface defects are often so small that they are not discovered on these misjudged balls and yet are injurious to bearing operation. In the event that some of these balls are not accurately spherical or are slightly off-size, it is not evident during such a visual inspection. An error in ball sphericity as much as a small fraction of a thousandth of an inch on the ball diameter can result in short bearing life and in sudden bearing failure.

It is, therefore, an object of this invention to provide an improved ball inspection device which eliminates the human element and which rapidly and accurately scans the entire surface of a ball and indicates any surface imperfection on the ball.

It is a further object of this invention to provide an improved automatic scanning device which inspects the entire surface of a ball for surface imperfections and which removes all dirt and dust that may be detrimental to the scanning operation.

It is a further object of this invention to provide an improved photoelectric scanning device for rapidly scanning the entire surface of a rotating ball and for thereafter sorting the ball in accordance with surface defects on the ball.

It is a further object to rotate and support a ball on a pocket of fluid while photoelectrically scanning the entire surface of the ball.

A further object of this invention is to provide an improved photoelectric ball inspection device which sequentially scans the surfaces of balls and sorts these balls in accordance with the accuracy of their sphericity.

To these ends and to improve generally upon devices and inspection methods of this character, this invention consists in the various matters hereinafter described and claimed. In its broader aspects, the invention is not necessarily limited to the specific structures selected for illustrative purposes in the accompanying drawings wherein Figure 1 is a perspective view partly broken away and showing the general arrangement of the invention.

Figure 9 is a diagram of a modified form of ball inspection device; and

Figure 10 is a schematic wiring diagram of the embodiment of Figure 9.

Generally considered, balls B to be inspected roll down a delivery tube 10 in stacked relation and are sequentially released one at a time by an escapement mechanism 12 from which each ball rolls down a pair of spaced knife edge members 14 and drops into a cup-shaped seat 15. A suitable fluid as air directed upwardly under pressure into the bottom of this cup-shaped seat, serves the dual purpose of maintaining the ball in rotation as well as blowing away from the ball any extraneous matter which might affect the inspection operation. One or more photocells move about the ball during its rotation and receive light reflected by the ball surface from a suitable lamp source. In the event that there are surface imperfections which usually appear as small black spots on the ball caused by an imperfect grinding of the ball, the photocells receive less light and act through an amplifying mechanism and other electronic mechanism which in turn controls a ball ejection mechanism that sorts the unacceptable balls from the acceptable balls. In the event of errors in sphericity or even in ball size, the light reflected from the light source will be angularly deflected providing less light to the photocells so that these balls will be also ejected into a bin or hopper containing the unacceptable balls. Additionally, a signal means indicates when a ball is determined unacceptable during inspection.

Figure 1:
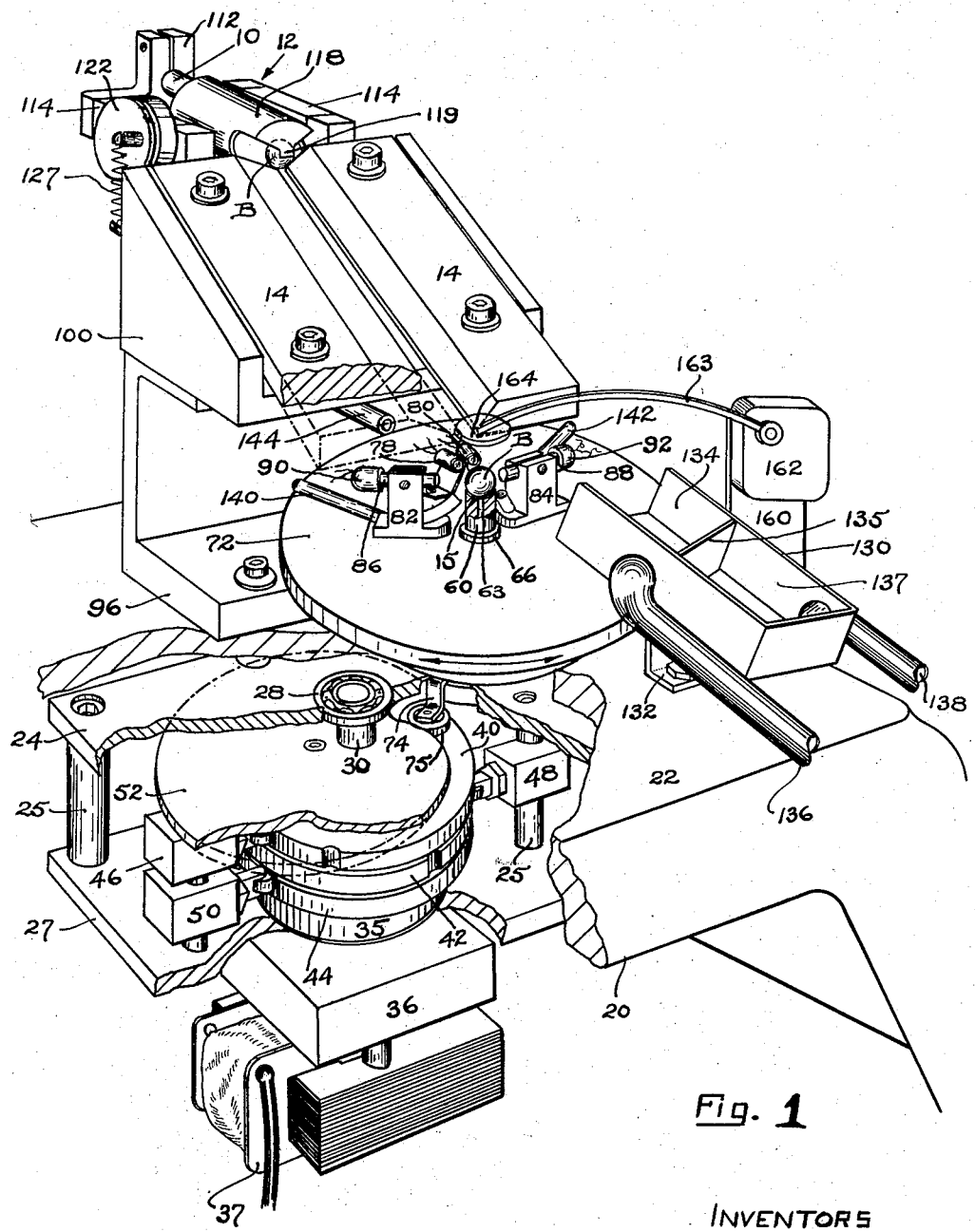
Figure 2:
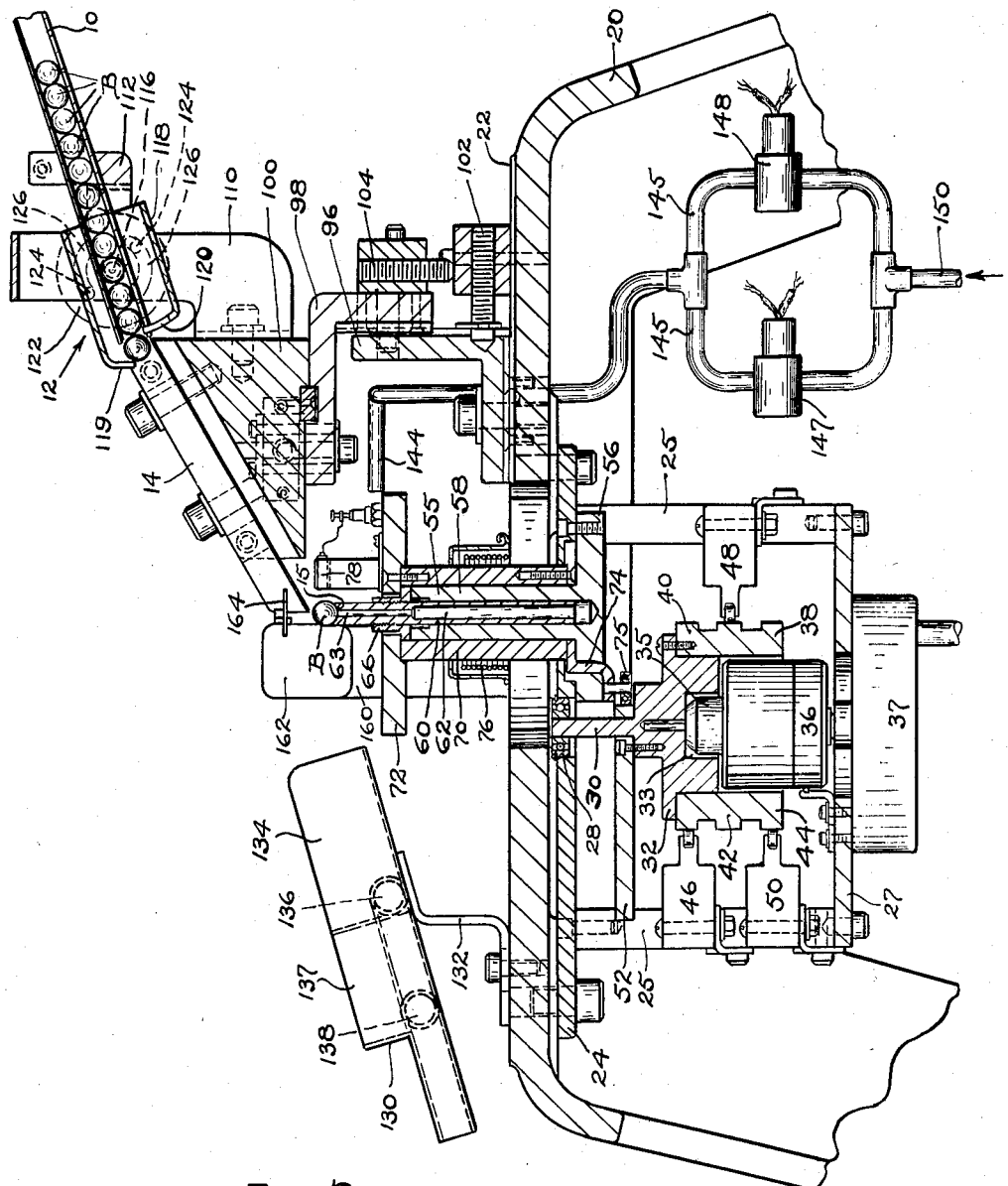
Figure 2 is a fragmentary side elevation partly in section.
Figure 5:
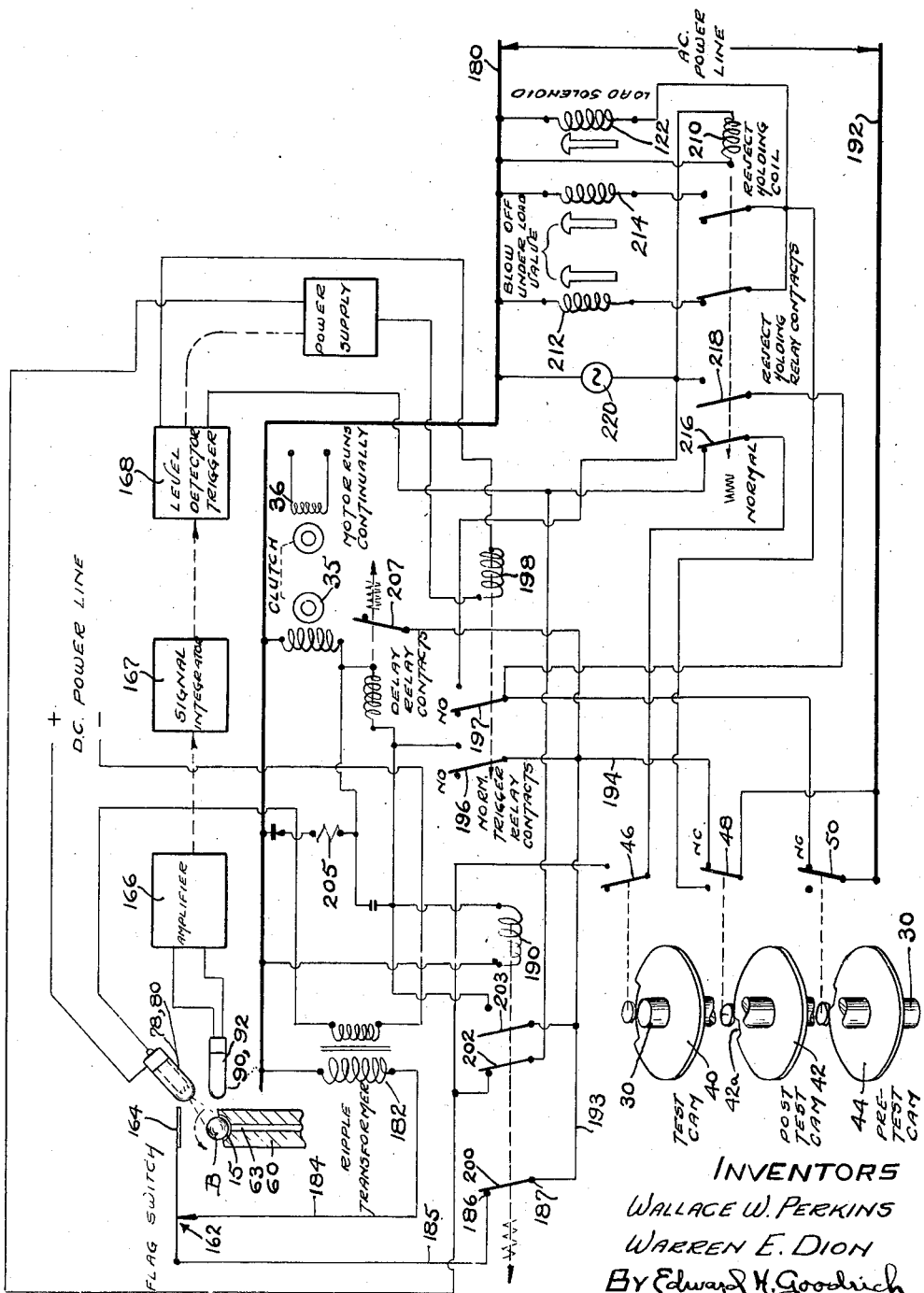
Figure 5 is a schematic wiring diagram.
Figure 6:
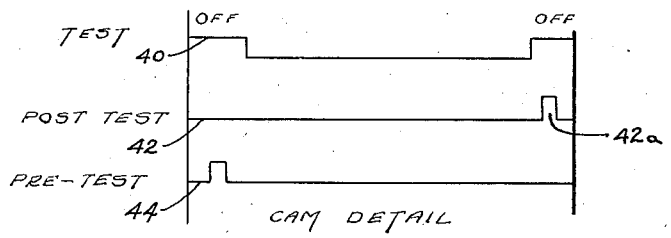
Figure 6 is a cam detail.
Figure 7:
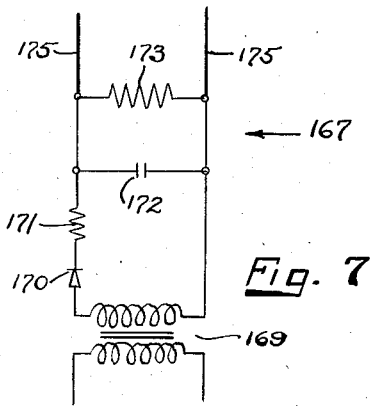
Figure 7 is a diagram of the signal integrator.

Referring first to the embodiment of Figures 1 and 2 and 5, a base 20 has a flat bed portion 22 to the under side of which is secured a mounting plate 24 from which depend posts 25 that support a lower mounting plate 27. A vertical shaft 30 is rotatably supported by bearings, one of which is shown at 28. The lower portion of this shaft has an enlarged hub 32 provided with a counterbore 33 which receives a clutch 35 illustrated as a magnetic clutch driven by a gear reduction unit 36 operated by a motor 37. A drum 38 is demountably secured to the hub 32 and has three cams comprising a test cam 40, post-test cam 42 and pretest cam 44, these cams respectively operating micro switches 46, 48 and 50. Secured to a shouldered upper portion of the shaft 30 is a generally heart-shaped rotating cam plate 52.

Figure 4:
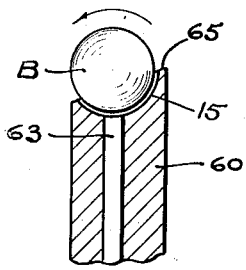
Figure 4 is a fragmentary view showing the supporting and rotation of a ball during inspection.

A sleeve 55 having a flanged portion 56 fastened to the under side of the mounting plate 24, has an upwardly extending cylindrical hub 58 which projects through free openings in the mounting plate 24 and in the bed portion 22 of the base 20. The hub 58 is counterbored to receive a vertically disposed pipe 60 which has an enlarged bore 62 at its lower end and a reduced bore or jet 63 at its upper end opening into the lower end of the seat 15 which is preferably partispherical for matingly receiving each ball B to be tested. This seat 15 is angularly slabbed off at its upper portion as shown at 65 (Fig. 4). Fluid under pressure as air from a suitable source is continuously fed into the lower end of the bore 62 and emerges at the upper end of the jet 63 with sufficient pressure to support the ball in the seat and also to blow away from the ball surface any bits of foreign matter such as dust or dirt which might affect the reflection of light to the photocell during a scanning operation. Due to the shape of the seat 15, the leakage of air about the ball will wrap around a greater portion of the rearward portion of the ball causing it to antifrictionally rotate in the seat about a horizontal axis. An adjustable collar 66 threaded over the upper end of the pipe 60 engages the top of the hub 58 and adjustably locates the ball seat 15 in the desired scanning position and in proper angular relation.

A sleeve member 70 is journalled for oscillation on the cylindrical hub 58 and supports at its upper end a substantially circular oscillatable plate 72. This plate surrounds the collar 66 and pipe 60 in spaced relation. A bell crank arm 74 secured to the lower end of the sleeve 70 rotatably supports a cam roller 75 engageable with the generally heart-shaped cam 52. A torsion spring 76 secured under tension between the sleeve member 70 and the base 20, urges the plate 72 clockwise to maintain the cam roller 75 in continuous operating engagement with the rotating cam 52. At the completion of a scanning cycle and while the clutch 35 is disengaged, the roller 75 locates in the vertex at the lowest portion of the cam 52 to correctly position the cams 40, 42 and 44 for the start of the next scanning cycle and to prevent overrun of these cams. Each single rotation of the cam assembly acts through the cam 52 and its associated linkage to oscillate the plate 72 through a predetermined extent. A pair of light sources as lamps 78 and 80 are respectively hooded and mounted in brackets fastened to the oscillatable plate 72. A pair of brackets 82 and 84 adjustably mounted on the oscillating plate 72 adjustably support at their upper ends sleeve members 86 and 88 in which are mounted photocells 90 and 92 arranged so that they respectively respond to portions of the light reflected by the ball being tested from the light sources 78 and 80.

Each of these photocells is preferably arranged to focus on a small portion such as the central portion of the light reflected from the respective light sources. Each photocell will respond to even a small difference in light reflection caused by minute dark portions such as specks on the ball surface resulting from improper grinding or other causes. Additionally, since the angle of reflection corresponds to the angle of incidence, these photocells will also respond to a ball surface which is slightly non-spherical or to a ball which is not the size to which the mechanism has been precisely adjusted. These photocells are preferably connected so that their accumulative response will act through an amplifier and a level detector trigger circuit to accurately control the sorting of the balls in accordance with the extent of surface defects and/or errors in ball size.

A bracket 96 fastened to the bed 22 adjustably supports a bracket 98 to which is adjustably secured a mounting block 100 having an angularly disposed trough in which are mounted the knife-edge track members 14. These members 14 are held in position by screws passing through slots so that the spacing between the knife edges may be adjusted for different ball sizes. The brackets 96 and 98 are adjusted as by screws 102 and 104 to locate the lower end of the knife edge members 14 at a position wherein a ball rolling down between these knife edges will drop into the ball seat 15 in the upper end of the pipe 60. These knife edges are preferably spaced to support a ball just below its horizontal diameter so that the ball will be dropped into the seat 15 while rapidly rotating after which the air jet in the seat will continue this ball rotation.

A bracket 110 secured to the rearward end of the mounting block 100 supports the lower end of the ball delivery tube 10 and has a generally yoked portion 112 provided with a pair of spaced side arms 114 in which are journalled a pair of laterally extending shafts 116 pivotally supporting a tubular escapement member 118. This escapement member has an internal diameter considerably larger than the exterior diameter of the delivery tube 10 and is provided at its forward end with a pair of upper and lower axially spaced escapement fingers 119 and 120 which operate generally in the manner of the verge escapement of a clockwork. A loading solenoid 122 secured to the bracket 110 and to an end of the shaft 116, tilts the escapement member 118 through a predetermined angular extent limited by a pair of pins 124 in arcuate slots 126. A spring 127 normally tilts the escapement member 118 forwardly and downwardly to locate the finger 119 between the upper ends of the spaced knife edge members 14 when no ball feeding occurs. In this position, the column of balls in the delivery tube 10 cannot advance further forwardly since the first ball of the column is restrained by the finger 119. However, under control of mechanism to be later described, when the loading solenoid 122 is energized, the tubular member 118 rocks counterclockwise so that the lower finger 120 engages the next to the first ball and only the first ball is released down the knife edges by the finger 119. Upon deenergizing of the solenoid 122, the finger 120 again moves downwardly and the ball column advances until the first ball is again engaged by the finger 119 for the subsequent release of this ball at the start of the next cycle.

At the completion of the scanning operation, each ball is ejected from the seat 15 and selectively directed into a two-part box 130 which is angularly supported by a bracket 132 on the base 20. The forward end of this box is open and has a pocket 134 to receive the acceptable balls which are directed by a sloping end wall 135 of the pocket into a discharge duct 136 opening through a side wall of the box. Similarly, a rear pocket 137 arranged to receive unacceptable balls, has a duct 138 opening through a side wall of the box and a sloping rearward end wall of this box directs the balls into the upper open end of the duct 138.

In the embodiment of Figures 1 and 2, at the completion of the ball scanning operation, the ball is ejected from scanning position at the seat 15 by an air jet either into the pocket 134 or into the pocket 137 depending upon the findings of the photocells during the scanning operation. A pair of tubes 140 and 142 are secured to the oscillating plate 72 and have inner bent ends directed upwardly close under the position of a ball B in the seat 15. The outer open ends of these angularly disposed tubes terminate at the periphery of the oscillating plate 72 and in such positions that one of these tubes will align with an air pressure duct 144 at the termination of each scanning cycle.

As shown in Figure 2, the duct 144 connects with an intermediate portion of a duct 145 which respectively communicates at its outer ends with an accept solenoid valve 147 and a reject solenoid valve 148, these solenoid valves being normally closed and connected to a suitable air pressure feed pipe 150. These solenoid valves 147 and 148 are selectively operated under control of the photocells. The valve 147 is a restriction valve and allows less air pressure to enter from the pipe 150 to the pressure duct 144 than does the valve 148. Hence, if the photocells find the surface and size of a ball as well as its shape acceptable, the restriction solenoid valve 147 is opened at the termination of the scanning cycle to blow the ball from its seated position at the top of the pipe 60 into the forward pocket 134 from which it rolls down the duct 136 into a bin (not shown) with other acceptable balls. If the photocells find a ball to be unacceptable, the solenoid valve 148 is opened creating a greater air pressure through the duct 144 and blowing the ball after scanning into the rear pocket 137 from which it rolls through the duct 138 to a bin (not shown) containing other unacceptable balls.

A bracket 160 projects upwardly from the base 20 and supports a flag switch 162 having a laterally extending shaft to which is secured an operating arm 163 terminating at its outer end in an enlargement or flag 164 located above the position of the seat 15. When there is no ball located in the seat 15, the air blast against the underside of the flag 164 from the jet 63 swings the arm 163 upwardly and clockwise to open the switch 162. However, when a ball B is located in scanning position, the upward flow of air from the jet 63 is restricted sufficiently so that the arm 163 swings downwardly to a position above the ball closing the switch 162.

Referring now to the operating cycle and more particularly to the operating cycle as controlled by the electronic circuit arrangement, the photocells 90 and 92 may be of the photodiode type and cooperatively control an amplifier 166 which in turn controls a signal integrator 167 and a level detector 168. During scanning, the signal integrator 167 accumulatively collects the responses from the amplifier 166 and the preadjusted level detector 168 controls the sensitivity response of the circuits in accordance with changes in ball size or imperfections on the ball surface which are not acceptable. The signal integrator 167 receives signals from the amplifier 166 in a transformer 169. The secondary of this transformer feeds through a rectifier 170, and resistor 171. A condenser 172 is connected across the secondary and is in parallel connection with a resistor 173. This condenser and the resistor 173 accumulatively collect the response from the amplifier and transmit signals to the level detector through lines 175. The level detector 168 may comprise a suitable voltage regulating device wherein only signals above a certain voltage are employed to operate a relay. During the scanning cycle, the ball is rotated in the seat 15 about a substantially horizontal axis and the photodiodes 90 and 92 are oscillated about a vertical axis through the ball to rapidly scan the entire surface of the ball. The fluctuation in the reflected light received by the photodiodes results from imperfections or inaccuracies in the ball surface since the light source such as the lamps 78 and 80 are fed from a direct current power source thereby normally providing a constant light source of uniform intensity.

Figure 8:
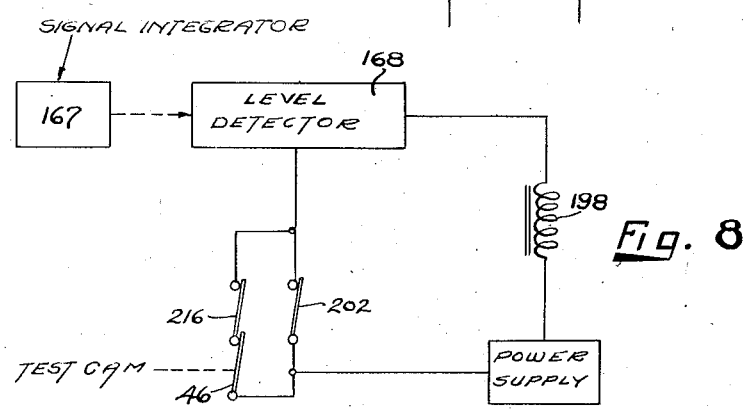
Figure 8 is a schematic diagram of the controls associated with the level detector.

Starting with the release of a ball B by the loading solenoid 122, this ball rolls down the inclined track 14 and drops into the partispherical seat 15 over the jet 63 where it continues to rotate. Before the ball reaches the seat, air pressure upwardly from the jet 63 impinges upon the flag 164 holding the switch 162 in open circuit. The test cam switch 46 which is operated by the test cam 40 is in open circuit position at the start of the cycle while the post test cam switch 48 operated by the post test cam 42 and also the pretest cam switch 50 which in turn is operated by the protest cam 44 are both in closed circuit positions at the start of the cycle as shown in Figure 5. When the ball locates in the seat 15, the impinging air from the jet 63 is cut off and the flag switch 162 shifts downwardly to a closed circuit position. At this time, current from a power line 180 flows through the primary of a ripple transformer 182, thence through line 184, flag switch 162 and line 185, the normally closed contacts 186 and 187 of a sweep holding relay 190, the current from contact 187 returning to the power line 192 through conductors 193, 194 and through the normally closed switch 48 operated by the cam 42. At this time, alternating current through the secondary circuit of the ripple transformer 182 is imposed upon one side of the D. C. power source producing a slightly fluctuating source of light in the lamps 78 and 80. The photodiode response to this initial fluctuation of the light during test causes the trigger circuit in the level detector 168 to connect a trigger relay solenoid 198 in circuit resulting in the shifting of normally open switches 196 and 197 towards the right to closed circuit positions. At this time, the switch 196 connects the sweep holding relay solenoid 190 in the circuit thereby shifting its three switch arms 200, 202 and 203 towards the right. This shifting of the sweep holding relay contacts disconnects the ripple transformer, resets the trigger of the level detector (Fig. 8), initiates the time delay of a delay network 205 and sets up an interlocking circuit through the switch 196 to hold the relay solenoid 190 energized. In the event that a ball is not released onto the seat 15, the flag switch 162 will remain open and the solenoid 198 will not be energized with the result that the scanning cycle will not start.

Upon completion of the delay time set up by the delay network 205, a solenoid operated switch 207 of the delay network shifts the solenoid operated clutch 35 and connects the continuously running motor 36 into a rotative driving relation with the cams 44, 42, 40 and 52. The rotating cam 52 now starts rotating the plate 72 in one direction and the photodiodes thereon in their scanning cycle. It will be noted that the contacts associated with switch members 202 and 203 on the sweep holding relay 190 are of the type which make contact before breaking it. This permits the sweep holding relay 190 to hold itself in the on position before it breaks the trigger circuit. Also, due to the position of the post test cam 42 at the start of the cycle, the actuation of the trigger circuit cannot cause a ball to be rejected at this time since the switch 48 disconnects current to both blow-off valves which are in closed positions.

As the cams start their simultaneous rotations upon completion of the delay period, the pretest cam switch 50 which is normally closed, is momentarily opened by the cam 44 thus permitting a reject holding relay 210 to reset. As the cams continue to rotate, the previously open test cam switch 46 is now closed by the cam 40 thus initiating the test portion of the cycle. If the ball being tested is acceptable and has no surface flaws, or other conditions which would cause it to be rejected, nothing happens during the further test portion of the cycle and the rotation of the cams and the rotation of the plate 72 proceed until the end of the test period at which time the switch 46 is again opened by the cam 40. Also, at the completion of the cycle, the follower roller drops into a recess 42a on the post test cam 42 causing the switch 48 to swing to the left hand position and directing current through the accept blow-off solenoid 212. In the event that the photocells determine the ball unacceptable, the trigger relay switch 196 closes directing current to the solenoid 210 causing the solenoid 212 to be deenergized and energizing the reject solenoid 214 to blow the ball from the seat 15 into the reject pocket 137. The operation of the solenoid 210 responds to the level detector 168 under control of the photodiodes and the duct 144 is aligned at the end of each cycle with one of the tubes 140 or 142 depending upon the position of the oscillated plate 72. The rotation of the ball B being scanned is sufficient so that the entire ball surface is scanned during a single oscillation of the plate 72. The energizing of the solenoid 210 shifts a switch arm 216 to open circuit position and a switch arm 218 to closed circuit position. The switch 216 interrupts the trigger circuit causing it to reset. The switch 218 now provides a holding circuit for the solenoid 210. Also, switch 218 makes contact before switch 216 breaks circuit. A lamp 220 in series with the reject holding solenoid 210 lights to indicate an unacceptable ball during scanning.

At the completion of the cycle, the post test cam switch 48 also opens the holding circuit of the sweep holding relay 190 thereby causing the clutch to be disengaged and stopping the rotation of the cams and the oscillation of the plate 72. This oscillation and cam movement cannot again be initiated until another ball falls on the jet and is sensed by the photodiodes, and the trigger circuit is actuated. Thus, it will be appreciated that the trigger circuit has been assigned the dual roll of judging a ball quality and initiating the oscillation of the plate 72 with the result that the trigger circuit, lamps 78 and 80 and photodiodes 90 and 92 are given a test each time that a ball is loaded. Any fault which would normally prevent a scanning action under these circumstances, would also prevent the oscillation of the plate 72 from starting. This, therefore, assures that the mechanism is always in correct testing condition while operating. Also, at the completion of the cycle, the loading solenoid 122 is energized by the reject holding relay contact of the solenoid 210 to start the next ball rolling down the rails and into the jet. At the completion of the cycle, the follower on the post test cam 42 drops in the cam recess 42a shifting the switch 48 to the left hand position causing the loading solenoid 122 to be energized whereupon the next ball is released down the track 14 onto the seat 15. Due to the time lapse of the ball rolling down the tracks 14, the previously tested ball has opportunity to be ejected from the seat 15 and the blow valve has opportunity to close before the ball drops into the seat.

Figure 3:
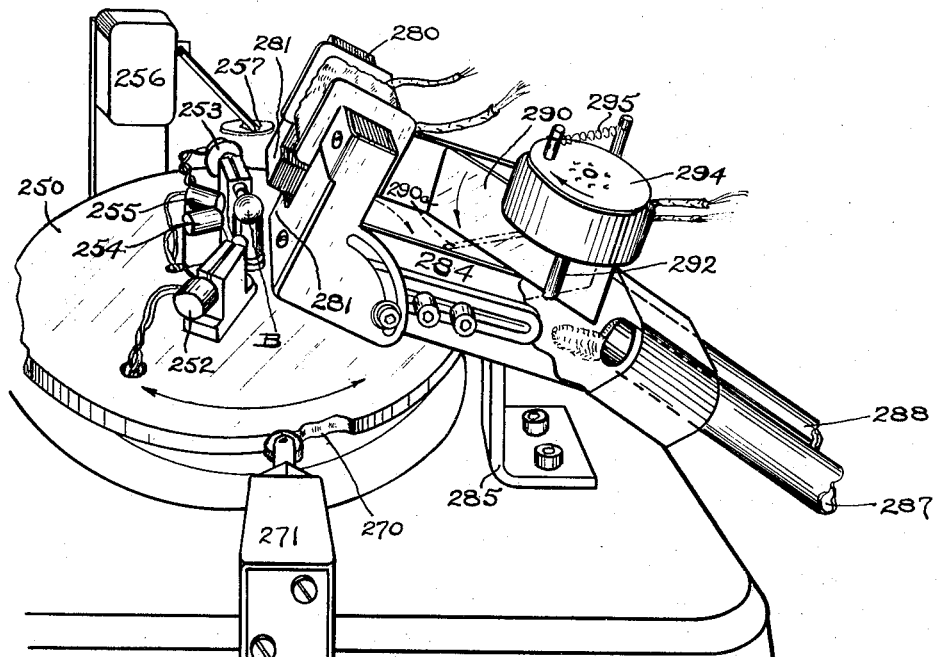
Figure 3 is a fragmentary perspective view of a modified form of the invention.

Figures 3, 9 and 10 show a modified construction wherein an oscillating plate 250 mounted on a shaft 251 is driven in arcuate oscillation somewhat similar to that of the oscillating plate 72. A pair of photocells 252, 253 are adjustably mounted on this plate and receive reflected light from lamps 254 and 255 during the scanning operation in a manner similar to that previously described with respect to Figure 1. An air operated flag switch 256 has a flag portion 257 above the ball seat 15 and operates in a generally similar manner to that of the switch 162.

The plate 250 is rotatably oscillated through a controlled extent by a pair of similar air motors 258, 258a having axially reciprocable piston rods 259 and 260 provided with rack portions meshed with a gear 261, these air motors being controlled by a pair of solenoids 262 and 264. The plate 250 has cam portions operating three switches only one of which is shown in Figure 3, all of these switches being diagrammatically shown in Figures 9 and 10. For clarity, the diagrammatic showings in Figures 9 and 10 illustrate these cam portions as three simultaneously operated cams including a test period cam 270 operating a switch 271, an end cam 274 operating a switch 275, and a reversing cam 276 operating a switch 277.

An electromagnetic ball unloader 280 is employed for ejecting the tested ball B from the seat 15 at the end of a scanning operation instead of the previously described air blow-off mechanism. This unloader 280 has an insulated winding about one leg of a ferrous core having a pair of spaced pole pieces 281 located above and slightly forwardly of the ball in the seat 15. The upper end of the pipe 60 forming the seat 15 is preferably composed of a non-ferrous material so that it will not objectionably influence the magnetic field passing through the ball when it is picked off of the seat 15 by the unloader 280. The ejected ball B is received in an inclined box 284 supported by a bracket 285 secured to the base. The electromagnetic unloader 280 and the box 284 are adjusted by clamping screws and brackets so that each time the ball is ejected, it will jump from the seat 15 between the pole pieces 281 and into the open upper end of the box 284.

The lower end of the box 284 has a pair of spaced ball-receiving openings respectively communicating with a duct 287 for receiving acceptable balls and with a duct 288 for receiving unacceptable balls, these ducts directing the sorted balls into suitable bins, not shown. A sorting baffle 290 angularly extends across the box 284 between its side walls and is carried by a shaft 292 journalled in the bottom of the box and supported at its upper end for oscillation by a rejection solenoid 294 arranged to partially rotate the shaft 292 for swinging the baffle from its full line position to its dot-and-dash indicated position 290a. A spring 295 urges the baffle clockwise and to its full line indicated position so that acceptable balls received in the box 284, will be diverted by the baffle and roll down through the duct 287 into a bin with other acceptable balls. When the photocells detect an unacceptable ball, the reject solenoid 294 swings the baffle 290 to its dot and dash indicated position 290a to direct the unacceptable ball from the box through the duct 288 into a bin with other unacceptable balls.

Referring now to the operating cycle of the structure of Figure 3 and more particularly to the circuit arrangement shown in Figures 9 and 10, the photocells 252, 253 cooperatively control an amplifier 300 which in turn controls a signal integrator 302 whose signals are responded to by a level detector 304. This electronic arrangement may generally correspond to that previously described with reference to Figure 5.

At the start of the cycle, the shaft 251 and cams 270, 274 and 276 are stationary, switch 271 is in open circuit position and switches 275 and 277 are shifted to their right hand closed circuit positions, as shown in Figure 10. Current from power lines 306 and 308 now flows through the switch 275 (which has just been closed) and energizes a loading solenoid 310 corresponding to the loading solenoid 122 and releases a ball B onto the track 14 in the manner described with respect to the structure of Figure 1. At the same time, an unloading relay 312 is energized by the closing of the switch 275 and swings a switch-arm 313 to its right hand position which connects the ball unloader 280 in circuit across a charged condenser 326 to eject any previous ball B from the seat 15 into the box 284. Due to the lapse of time while the ball B rolls down the track 14, any previous ball in the seat 15 from a prior scanning operation will be ejected into the box 284 before the ball just released reaches this seat 15. When the ball B drops into the seat 15 from the track 14, air from the jet 63 is cut off sufficiently from the flag 257 to let the switch 256 close placing a delay network 315 in circuit to operate a delay relay 316 which closes a switch 318 after a predetermined short period.

If a ball is not delivered onto the seat 15, the upward flow of air from the jet 63 impinging upon the flag 257 holds the switch 256 in open circuit position and the scanning cycle is prevented from starting. Upon completion of the delay controlled by the network 315, a delay solenoid 316 is energized sufficiently to close a switch 318 placing the air motor solenoid 262 in circuit through the switch 277 causing the air motor 258a to act through the piston rod 260 and gear 261 to start rotation of the cams 270, 274 and 276 and plate 250 in a clockwise direction as indicated. At the same time, the closing of the switch 318 energizes the solenoid of a hold reset relay 320 opening a switch 322 to disconnect a holding relay 334 to be described. Immediately after the start of the scanning operation, the follower on the end cam 274 drops off the high point of this cam opening switch 275 and immediately thereafter the follower on the test period cam 270 is engaged by a high point of this cam 270 closing the switch 271. The opening of the switch 275 causes the loading solenoid 310, unloading relay 312, relay solenoid 316 and hold reset solenoid 320 to all become deenergized. With this switch 275 in open circuit position, the switch 313 shifts to the left hand position to charge the condenser 326 through a rectifier 324 and the switch 318 is shifted to open circuit position and the switch 322 closes. The opening of the switch 318 places the air motor solenoid 262 in open circuit. However, the clockwise swing of the cam assembly and plate 250 continues until the piston rod 260 reaches the end of its stroke. The closing of the switch 271 following the opening of the switch 275 (Figure 9) connects the power supply to the level detector 304 during the subsequent scanning operation. If the photocells 252 and 253 find that the ball B being scanned is unacceptable due to surface imperfections, out of roundness, or unacceptable size, a relay 330 is energized closing a switch 332 which places the reject solenoid 294 in circuit with the power lines causing the sorting baffle 290 to swing from its full line indicated position to its dot and dash indicated position 290a so that upon completion of the scanning operation, the ball will be diverted from the box 284 into the rejection duct 288. The now closed switch 332 also directs current to a holding relay 334 in parallel connection with the rejection solenoid 294. The energizing of this holding relay 334 closes a switch 336 in series with the now closed switch 322 to maintain a holding circuit across the rejection solenoid 294 since the switch 332 is opened prior to completion of the scanning operation. If the photocells find no ball imperfections, the sorting baffle 290 remains in its full line position under the influence of the spring 295 and the ball B is diverted into the duct 287 at the termination of the scanning cycle.

During the swing of the cam assembly, the reversing cam 276 shifts the switch 277 to its left hand position for subsequently connecting the air motor solenoid 264 in circuit. At this time, the solenoid 264 is not placed in a circuit since the delay relay switch 318 is in open circuit position. Just before the end of the cycle, the test period cam 270 opens the switch 271 cutting off the power supply to the level detector 304 to prevent its response before a succeeding ball B becomes settled and uniformly rotating in the seat 15 during the next scanning operation. At the completion of the cycle, the end cam 274 again closes the switch 275 causing the electromagnetic ball loader to be energized through a heavy momentary surge of current from the charged condenser 326 to remove the inspected ball from the seat 15 into the box 284 for sorting in accordance with the ball condition. Also, at this same time another ball is started down the track 14 for the ensuing operation.

It is to be understood that this invention is not limited to the specific circuit arrangements described and that various other electronic circuits may be employed within the scope of our invention to produce the photoelectrically controlled scanning and sorting cycle.

We claim:

1. An inspection mechanism for a member having a surface of revolution comprising a support for receiving the member, means providing a light source directed onto said surface of revolution, a photoelectric device responsive to the reflection of said light source from said surface, indicating mechanism responsive to the photoelectric device, and means directing fluid against said surface to support and rotate said member and to remove all loose material therefrom during the inspection of the surface.

2. A ball inspection mechanism comprising a support for receiving a ball, means providing a light source directed on said ball, a photoelectric device responsive to the reflection of said light source from a portion of the ball surface, indicating mechanism responsive to the photoelectric device, and means continuously directing fluid under pressure against the surface of the ball to support the ball during inspection.

3. An inspection mechanism for a member having a surface of revolution comprising a support for receiving the member, a light source directed onto a portion of the surface of revolution, photocell mechanism responsive to the reflection of said light source from a portion of the surface of revolution, means providing relative movement between the member and the photocell mechanism causing successive portions of the surface of revolution to reflect light to the photocell mechanism, indicating means responsive to the photocell mechanism, and means directing fluid under pressure onto said surface to support and rotate said member and to remove loose material from said surface of revolution.

4. An inspection mechanism for a member having a surface of revolution comprising a support having a seat for receiving the member on said surface of revolution, means directing fluid under pressure between the seat and the surface of revolution and around said surface, a light source directed onto a portion of said surface, a photocell responsive to the reflection of the light source from a portion of said surface of revolution, means providing relative movements between said member and the photocell to present successive portions of the surface of revolution into inspection range of the photocell, and mechanism controlled by the photocell for indicating errors in said surface of revolution.

5. A ball inspection mechanism comprising a support having a cup-shaped seat for receiving a ball, means directing fluid under pressure into the bottom of the seat and around the ball to rotate the ball in the seat and to remove all loose material from the ball surface, a light source directed onto a portion of said ball surface, a photocell directed onto the ball surface and responsive to a portion of the light source reflected from the ball surface, and mechanism controlled by the photocell for indicating a ball with surface defects.

6. A ball inspection mechanism comprising a support having a parti-spherical seat for receiving a ball, the top portions of said seat being angularly disposed to a horizontal diametrical plane through the ball, means directing fluid under pressure into the bottom of the seat and upwardly around the ball to rotate the ball and to remove loose particles from the ball surface, a light source, means directing the light source onto a portion of the ball, a photocell directed onto the light reflected by the ball surface from said light source, and indicating mechanism responsive to the photocell for determining balls of unacceptable surface.

7. A ball inspection mechanism comprising a support having a cup-shaped seat for receiving a ball, means directing fluid under pressure into the bottom of the seat and non-uniformly around the ball to rotate the ball about an axis and to remove loose material from the ball surface, a support member rotatable about an axis angularly disposed to the axis of ball rotation, a lamp mounted on the support member and directed onto a portion of said ball, a photocell mounted on the support member and focused on a portion of the light reflected by the ball from said light source, means to rotatably move the support member about its axis during ball rotation, and mechanism responsive to the photocell for indicating balls having an unacceptable surface.

8. A ball inspection mechanism comprising a support for receiving and rotating a ball, a light source directed onto a portion of the ball, a photocell responsive to a portion of the light reflected by the ball surface from said light source, the light reflected to the photocell varying with ball surface errors, mechanism to simultaneously swing the light source and photocell about the ball during ball rotation to successively bring all portions of the ball surface into scanning range of the photocell, means directing air under pressure against the ball surface to remove loose material therefrom before scanning, and pneumatic mechanism actuated at the end of the scanning cycle and responsive to the determination of the photocell scanning for blowing the ball from the seat selectively into one of two bins in accordance with ball surface errors.

9. A ball inspection mechanism comprising a support for receiving and rotating a ball, a light source directed onto a portion of the ball, a photocell responsive to a portion of the light reflected by the ball surface from said light source, the light reflected to the photocell varying with errors in the ball surface, mechanism to simultaneously swing the light source and photocell about the ball during ball rotation to successively bring all portions of the ball surface within photocell viewing range, means directing air under pressure against the ball to remove all loose matter therefrom before photocell viewing, electronic mechanism responsive to the accumulative ball surface errors determined by the photocell, means to adjust the electronic mechanism with respect to the extent of ball surface error acceptable, and electromechanical mechanism for removing a ball from said seat and sorting it in accordance with the extent of surface error found by the photocell.

10. A ball inspection mechanism comprising a support having a cup-shaped seat for receiving a ball, means directing fluid under pressure into the bottom of said seat for rotating the ball about an axis and for removing loose material from the ball surface, mechanism including an inclined track for rotatably delivering a ball into the seat, photoelectric mechanism for scanning successive portions of the ball surface, and sorting mechanism which delivers the ball from the seat selectively into one of the two chambers in accordance with the extent of ball surface errors determined by the photocell.

11. A ball inspection mechanism comprising a support having a cup-shaped ball-receiving seat, means directing air under pressure beneath the ball in the seat for supporting and rotating the ball and for removing loose material from the ball surface, an inclined track for rotatably delivering a ball onto the seat, an escapement mechanism for successively and individually releasing balls onto said track, photoelectric mechanism for scanning successive portions of the surface of the rotatiing ball in said seat, sorting mechanism for removing a ball from the seat after each scanning operation and selectively depositing the ball into one of two chambers in accordance with the extent of ball surface errors determined by the photocell, and means responsive to the air flow from said seat for preventing operation of the photoelectric and sorting mechanism when the seat has no ball therein.

12. A ball inspection mechanism comprising a support having a seat for receiving a ball, means directing fluid under pressure beneath the ball in said seat to rotate the ball and to remove dust and loose material therefrom, a light source directed onto the ball, a photocell receiving light reflected by the ball from said source, mechanism to swing the light source and photocell about the ball for a predetermined period while the photocell scans the ball surface, electronic means responsive to the accumulative surface errors on the ball as determined by the photocell, air actuated mechanism responsive to the electronic means at the end of said period for blowing the ball from the seat selectively into one of two chambers in accordance with the extent of accumulative ball surface errors.

13. A ball inspection mechanism comprising a support having a cup-shaped seat for receiving a ball, means directing fluid under pressure beneath the ball to rotate the ball and to remove loose material therefrom, a light source directed onto a portion of the ball, a photocell focused on the ball and receiving light reflected by the ball from said source, driving mechanism to swing the light source and the photocell about the ball for a predetermined period while the photocell scans successive portions of the ball surface, electronic means responsive to the accumulative surface errors on the ball as determined by the photocell, a container for receiving balls, electromagnetic means actuated at the end of the scanning cycle for lifting the inspected ball into the container, a sorting baffle in the container responsive to the electronic means for selectively directing the tested ball into one of two chambers in accordance with the extent of ball error determined by the photocell.

14. A ball inspection mechanism comprising a support having a seat for receiving a ball, means for rotating the ball in said seat, a light source directed onto the ball, a photocell receiving light reflected by the ball from said source, mechanism to move the light source and photocell relative to the ball causing the photocell to successively scan portions of the ball surface, electronic means responsive to the reflected light received by the photocell during scanning, sorting mechanism responsive to said electronic means, and means responsive to the initial location of the ball in said seat for testing the photocell and said electronic means before the scanning operation.

15. A ball inspection mechanism comprising a support having a cup-shaped seat for receiving a ball, means directing fluid under pressure into the bottom of the seat and non-uniformly wrapping about the ball to rotate the ball and removing loose material from the ball surface, a uniform light source angularly directed on a portion of the ball, a photoelectric cell receiving light reflected by the ball from said source and responding to variations in the reflected light produced by surface imperfections on the ball, a signal integrator which accumulatively responds to the ball surface imperfections determined by the photocell, a level detector responsive to a predetermined strength of signal from the integrator, and means responsive to the level detector for selectively segregating the ball in accordance with the extent of its surface imperfections.

16. A ball inspection mechanism comprising a support having a cup-shaped seat for receiving a ball, means directing air under pressure beneath and around the ball to rotate it about a substantially horizontal axis, the flow of air about the ball serving to remove any loose matter therefrom, a rotatably mounted plate oscillatable about a vertical axis through said ball, a light source mounted on the plate and directed onto a portion of the ball, a photocell adjustably mounted on the plate and focussed on the light reflected by the ball from said light source, driving mechanism to rotate the plate through a predetermined movement while the photocell scans the entire ball surface, cam operated means including an escapement for delivering a single ball into the seat before the start of said oscillation, means timed with the start of said oscillation for testing the photocell response, and discharge mechanism controlled by the accumulative photocell response during scanning for ejection of the ball from the seat selectively into one of two chambers in accordance with the extent of surface imperfections on the ball.

17. A ball inspection mechanism comprising a support having a cup-shaped ball-receiving seat, means directing air under pressure between the seat and ball to rotate the ball and remove loose material thereon, a plate oscillatable about a vertical axis through the ball, a light source and a photocell on said plate, the photocell receiving light reflected from said source by the surface of the ball and responding to ball surface imperfections affecting the light reflection, an escapement member for releasing balls individually onto the seat, a cam for oscillating the plate, a pretest cam, a test cam and a post test cam, means simultaneously driving all of said cams, an ejecting mechanism responsive to the photocell for removing the ball from the seat and segregating it in accordance with the extent of its surface imperfections, cam responsive mechanism releasing a ball onto said seat and starting oscillation of said plate, a switch associated with the pretest cam for testing the photocell circuit, an integrating and detecting circuit responsive to operation of the test cam under conrol of the photocell, and switching mechanism responsive to the post test cam for operating the ejection mechanism.

18. A ball inspection mechanism comprising a support having a cup-shaped seat for receiving a ball, means directing air upwardly through said seat and around the ball to rotate the ball and to remove loose material therefrom, a uniform light source including a lamp normally served by direct current and focused on a portion of the ball, a photocell receiving light reflected from the lamp by the ball surface and responsive to changes in light caused by ball surface imperfections, electronic means responsive to the photocell, a ball sorting mechanism controlled by the electronic means, a transformer connected in series with the lamp, and a switch controlled by the flow of air from said seat, said switch temporarily connecting the transformer in the lamp circuit to test the photocell and electronic means immediately after a ball enters the seat, and said switch preventing operation of the ball sorting mechanism when there is no ball present in said seat.

References Cited in the file of this patent

UNITED STATES PATENTS

| | | |
|---|---|---|
| 2,051,695 | Glacy | Aug. 18, 1936 |
| 2,278,800 | Rodanet | Apr. 7, 1942 |
| 2,580,275 | Bickley | Dec. 25, 1951 |
| 2,701,055 | Strom | Feb. 1, 1955 |